Dec. 9, 1958    J. SHEETS    2,864,049
UNDERVOLTAGE PROTECTING CONTROL SYSTEM
Filed June 3, 1955    2 Sheets-Sheet 1

INVENTOR.
Jack Sheets
BY Martin Kalkow
ATTORNEY

Dec. 9, 1958   J. SHEETS   2,864,049
UNDERVOLTAGE PROTECTING CONTROL SYSTEM
Filed June 3, 1955   2 Sheets-Sheet 2

INVENTOR.
Jack Sheets
BY
Martin Kalikow
ATTORNEY

United States Patent Office 2,864,049
Patented Dec. 9, 1958

2,864,049

UNDERVOLTAGE PROTECTING CONTROL SYSTEM

Jack Sheets, Randolph, Ill., assignor to General Electric Company, a corporation of New York Application June 3, 1955, Serial No. 512,939

9 Claims. (Cl. 318—453)

My invention relates to control apparatus for electromagnetic switching devices or relays such as magnetic contactors and starters for motors and, more particularly, to protective control apparatus for energizing a plurality of electrical devices from a common power source, such as in oil field pumping installations where a plurality of motors are energized during the starting or restoration of pumping.

One problem involved in such control apparatus is that a reduction in voltage of the common power source caused for any reason, such as by simultaneous starting of a plurality of the motors, may result in damage to the magnetic contactor in the control circuits as well as to the motors themselves. In order to meet this problem it has become common practice to include an undervoltage relay in each motor control circuit together with timing means having differently set time cycles in order that the motors will each be energized in predetermined time sequence after the restoration of power rather than simultaneously. This results in a rather complicated and expensive circuit and one in which a plurality of timing mechanisms are used merely to reset undervoltage relays.

Accordingly, an important object of the invention is to provide a control circuit for energizing electromagnetic equipment such as a contactor or motor in which undervoltage protection is provided by a timing mechanism without the necessity for an undervoltage relay.

Another object of the invention is to provide a control system for energizing a plurality of electrical devices, such as motors, where a single timing device in each control circuit functions to provide not only undervoltage or other abnormal voltage protection but also to provide automatic control of the cycle of operation of each device.

In general, in accord with the invention each electromagnetic device, for example—magnetic contactor or motor starter—desired to be protected is provided with a set of auxiliary or holding contacts which is connected in parallel with a timer switch. This switch is connected in series with the contactor coil for connection to a voltage source and is arranged to be periodically closed by the timer for very brief or "momentary" time intervals, for example, a few seconds, insufficient to cause damage to the coil upon undervoltage of the voltage source. The period during which such momentary closure of the contacts occurs is preferably also made relatively short, for example, once every few minutes. If the voltage at the source is sufficient to close the contactor fully during the momentary closure of the timer switch the energizing circuit of the contactor is completed through the auxiliary holding contacts and the contactor remains energized after the timer switch is opened. If, on the other hand, the source voltage is insufficient to pick up the contactor, the action of the timer switch causes the circuit to apply this "undervoltage" to the coil only for a few seconds every few minutes until the voltage returns to normal or becomes sufficient, at which time pick up of the contactor occurs upon the succeeding momentary closure of the timer switch. Such momentary attempts to energize the contactor at undervoltage condition has been found to result in no perceptible damage to the coil or contactor even after several thousand attempts.

Another feature of the invention is that where a plurality of such control circuits are used to energize a plurality of motors from a common power source, no predetermined time synchronization is needed between the operation of each of the timers in the several control circuits. This is because each timer starting switch operates for only a very short interval of time relative to the period or time cycle. Because of this, even under completely random operation of the various timers, it is extremely unlikely that any two switches will be operated simultaneously and even more unlikely that more than two switches would ever be operated simultaneously.

In accord with a further feature of the invention, the timer is preferably constructed to operate a program switch which is connected in series with the momentarily contacting starting switch and functions to determine the period or cycle during which each motor is desired to be run. In an oil field pumping control system this enables a single timer in each control circuit both to function as undervoltage protection for the motor as well as automatically to control the general oil pumping cycles.

The novel features believed characteristic of the invention are set forth in the appended claims. The invention, however, together with further objects and advantages thereof may be easily understood by referring to the following description taken in connection with the accompanying drawings in which—

Figure 1:
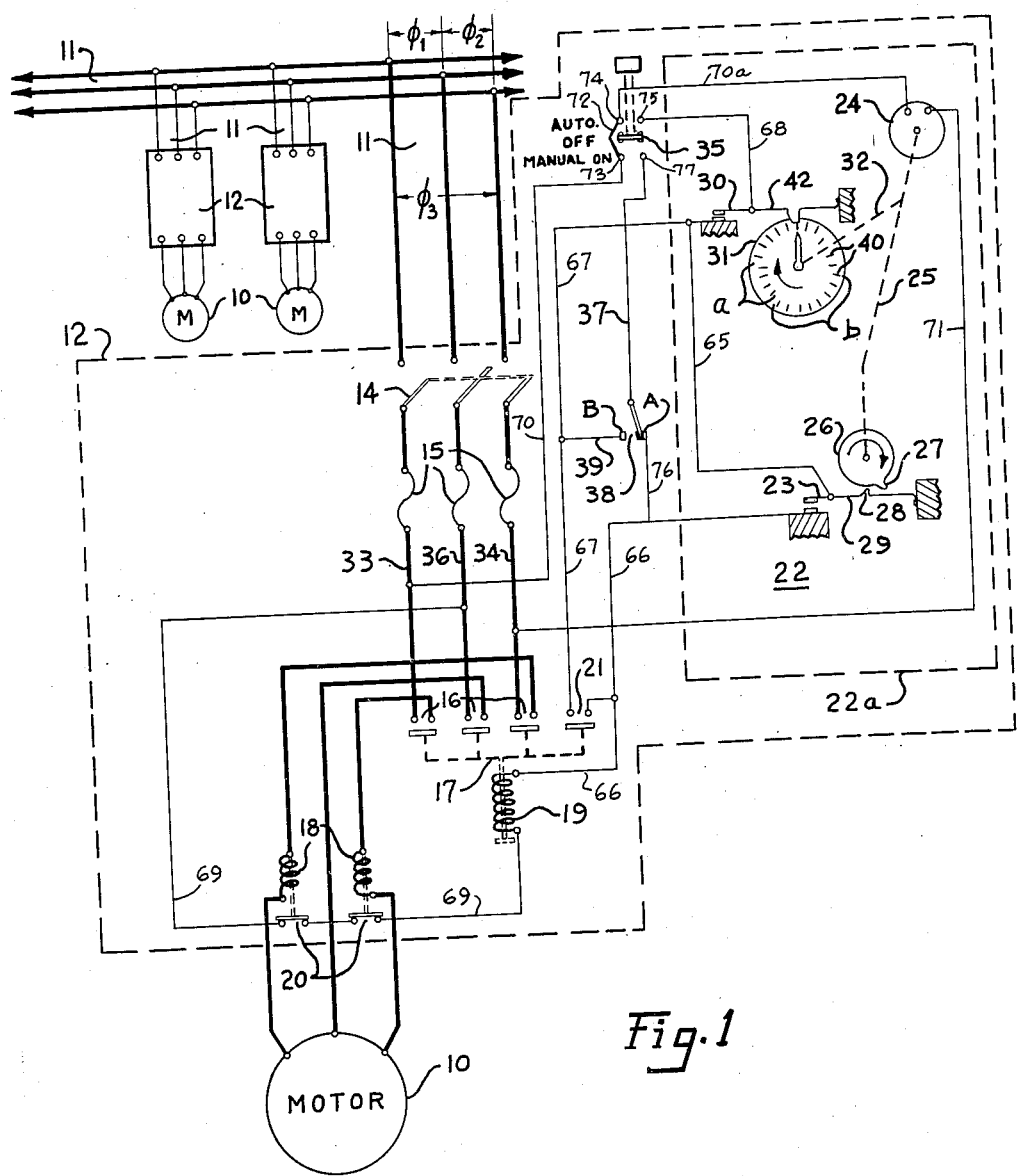
Figure 1 is a schematic circuit diagram of the control system of the invention.
Figure 2:
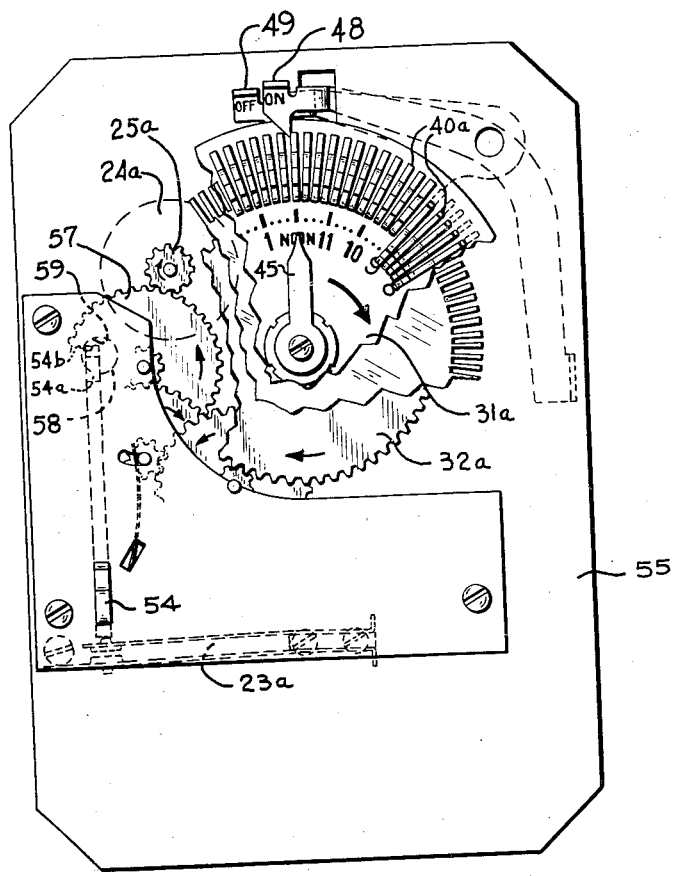
Figure 2 is a front view, with parts broken away, of a timer adapted for use in connection with the invention.
Figure 3:
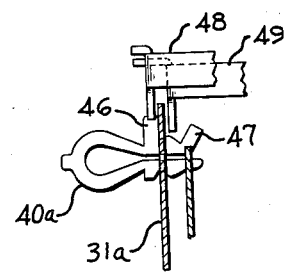
Figures 3 and 4 are detail side views of the program adjusting members of the timer of Figure 2 in "on" and "off" positions respectively.
Figure 4:
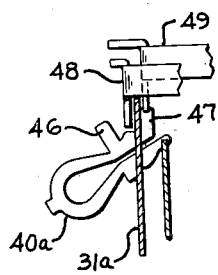

Referring now to Figure 1, a control system embodying the invention is shown in connection with a plurality of motors 10 energized from a common three-phase electric power source 11. The control system comprises a plurality of control circuits 12 each adapted to be connected to the three-phase power line 11, one of the control circuits 12 being shown in full circuit diagram in Figure 1. As is conventional, each control circuit includes a line switch 14 and line fuses 15 in each line conductor. Power to energize each motor 10 is supplied through the principal contacts 16 of an electromagnetic switching device or relay 17, commonly called a magnetic contactor and through the coils or other operating mechanism of suitable overload relays 18 in at least two line conductors of the three phases as shown. Power for energizing the coil 19 of contactor 17 is supplied through the contacts 20 of overload relays 18 in a manner more fully to be described hereinafter.

Contactor 17 is provided with a set of auxiliary or holding contacts 21. These auxiliary contacts 21 need not be as massive or operate with the same contact force as the principal contacts 16 since they need not carry substantial currents and may, for example, be a simple switch. Magnetic relays and contactors having such additional auxiliary or holding contacts are well known to the art and will not be further described here.

In accord with the invention a timer 22 schematically shown enclosed within dashed line 22a is provided having a starting switch 23 connected through wire conductors 65, 66 and 67 in parallel with auxiliary contacts 21. As will be more fully described hereinafter, starting switch 23 is also connected either directly or through a programming switch 30 in series with coil 19 to a voltage source, conductors 33, 36, comprising one phase of the three-phase power line 11. This starting switch 23 is arranged to be mechanically closed periodically by the timer 22 for a very brief or "momentary" interval such as a few seconds. The period between such momentary closures of the starting switch is preferably also quite short, for example, only a few minutes.

One simple mechanism for accomplishing this action of starting switch 23 is diagrammatically illustrated in Figure 1 as comprising an electric timing motor 24 connected by a gear train designated by dashed line 25 to a cam member 26 for rotation at a frequency of one revolution every few minutes. The member 26 has a small projection 27 outstanding from its periphery which engages and momentarily depresses a corresponding projection 28 on a movable spring contact arm 29 of switch 23.

Timer 22 also includes a program switch 30 arranged to be opened and closed at predetermined times for predetermined time intervals in accord with the preadjustments of the timer mechanism. Any conventional timer mechanism may be employed for this purpose. One such timer mechanism is diagrammatically illustrated in Figure 1 as a timer wheel 31 rotated by motor 24 at a speed of one revolution per day through a gear train designated by dashed line 32. Closely spaced program adjusting members 40 which may be moved radially over the face of wheel 31 either maintain the resilient switch arm 42 in an elevated "open" switch position or allow it to drop to its "closed" switch position for predetermined intervals $a$ and $b$ respectively. Electric timing motor 24 is continuously energized by connection through wire conductors 70, 70a and 71 to line conductors 33 and 34 representing one phase of the three-phase power source. Wire conductors 70 and 70a are continually interconnected by a jumper 72 between input contacts 73, 74 of a manually operable switch 35. Programing switch 30 is connected through wire conductors 68 and 70 in series with contacts 74, 75 of manually operable switch 35, and through wire conductors 65, 66 and 69 in series with starting switch 23, contactor coil 19, and overload relays 20 between line conductors 33 and 36 representing another phase of the power source.

Manually operable switch 35 is preferably constructed to have three positions: Namely, an automatic position in which the series circuit for energizing coil 19 is completed through timer switches 30 and 23; an intermediate "off" position in which this circuit is broken and no other circuit is made, and a "manual on" position in which circuits for energizing coil 19 are completed which bypass and eliminate the function of one or both timer switches 23 and 30. More specifically, with manual switch 35 in its "manual on" position a circuit for energizing coil 19 of contactor 17 is completed across conductors 33 and 36 through conductors 69, 66, 76, 37 and 70, contacts 20 of overload relays 18, contacts 73 and 77 of switch 35 and pole "A" of bypass switch 38 as indicated. When bypass switch 38 is thrown to its opposite position contacting pole "B," conductor 37 which receives power through "manual on" contacts 73, 77 of switch 35 is connected through conductors 39 and 67 to one side of auxiliary contacts 21 and through conductors 39, 67 and 65 to one side of starting switch 23 thereby to bypass program switch 30 whenever manually operable switch 35 is in its "on" position. Under this latter condition of the circuit, i. e. with switch 35 in its "manually on" position and switch 38 contacting pole "B," contactor coil 19 will be energized whenever starting switch 23 is closed under proper voltage conditions in the line source by virtue of current flow in the series circuit including switch 23 and coil 19 connected through conductors 69, 66, 65, 67, 39, 37 and 70 across line conductors 33, 36. Coil 19 will remain energized after starting switch 23 is opened by virtue of a completion of the energizing series circuit across line conductors 33, 36 through wire conductors 70, 37, 39, 67, auxiliary contacts 21, and conductors 66 and 69 regardless of the position of program switch 30.

With manually operable switch 35 in its "automatic" position bridging contacts 74 and 75, the circuit for energizing coil 19 includes both the program switch 30 and the starting switch 23 and may be traced across line conductors 33 and 36 through conductors 70, 68, 65, 66 and 69. In this "automatic" position of switch 35 once coil 19 is energized and auxiliary contacts 21 are closed, the coil 19 remains energized only while the program switch 30 is closed by virtue of a circuit completed across line conductors 33 and 36 through conductor 70, contacts 74, 75 of switch 35, switch 30, conductor 67 holding contacts 21, conductor 66, coil 19, and conductor 69 including overload relay contacts 20.

In the usual operation of the control system of Figure 1, the line switches 14 of each control circuit 12 are closed, the timer mechanism for controlling the program switch 30 is adjusted to give the desired operating cycle for each motor involved, and the manually operable switches 35 are then thrown from their "off" to their automatic positions. Each of the starting contactor coils 19 will then be energized to close contactor 17 and energize motor 10 whenever starting switch 23 and program switch 30 are both closed by virtue of the action of timer 22 and will remain energized as a result of completion of the circuit through auxiliary contacts 21 even after the momentarily closed starting switch 23 has opened. Since each cam member 26 of the timers 22 in the several control circuits 12 operates its associated switch 23 at random, it is unlikely that more than one of the contactors 17 will be energized at any given instant of time. The period of operation of each motor will, of course, be determined by the length of time the program switch 30 of its associated timer 22 has been set to remain closed. When program switch 30 opens, the coil energizing circuit through holding contacts 21 is broken, and contactor 17 will drop open deenergizing the motor 10. It will be appreciated that starting switch 23 continues to be momentarily closed every few minutes by timing motor 24 and cam member 26 regardless of the position of program switch 30. As long as program switch 30 is open and manually operable switch 35 is in its "automatic" position, the periodic frequent closure of switch 23 will have no affect upon contactor coil 19 since no current will be supplied therethrough. However during the initial closure of program switch 30 and the period of the day that programing switch 30 remains closed, starting switch 23 serves three purposes. First of all, with power applied to line conductors 33, 34, and 36, momentary starting switch 23 controls the random length of time which elapses after the closure of program switch 30 before contactor 17 will be energized to start motor 10. Secondly, during the period program switch 30 is already closed, momentary starting switch 23 controls the random length of time which elapses after an initial application or subsequent restoration of power to the line conductors 33, 34, and 36 before contactor 17 will be energized to start motor 10. Thirdly, momentary starting switch 23 continually protects the contactor 17 against damage due to undervoltage in the power source 11 or in the line conductors 33, 34 and 36. More specifically, it will be appreciated that the timers 22 of the several motor control circuits 12 have no synchronization nor interconnection between them, and that the projection 27 of the several cam members 26 and the various timers 22 have random rotational positions relative to one another. The various control circuits 12 will automatically and safely reenergize their associated motors at slightly differing times immediately upon a restoration of power after a power failure or other fault since each timer 24 will be immediately energized by virtue of its direct connection across conductors 33 and 34 thereby reenergizing its associated motor 10 whenever cam member 26 rotates the remaining distance necessary momentarily to close starting switch 23.

The undervoltage protection of contactor 17 provided by starting switch 23 results from the fact that current is not continually applied through the coil 19 of contactor 17 unless the line voltage is sufficient to cause contactor 17 to raise its armature and firmly close holding contacts 21. As is well known, damage to a magnetic contactor will not occur if insufficient power is applied to its coil for only a short interval of time such as a few seconds. In the circuit of Figure 1, an undervoltage condition in line 11 or in conductors 33, 34 or 36 will cause contactor 17 to "drop out" if previously energized or to fail to "pick up" if previously deenergized. If previously energized, the holding circuit to auxiliary contacts 21 will be broken upon such "drop out" and no power will be supplied to coil 19 until starting switch 23 is momentarily closed.

In the event of a continuing undervoltage condition in the line during the momentary closure of starting switch 23, the coil 19 will not pick up the contactor 17 but no damage will occur to the contactor because of the short interval of time during which current is being supplied therethrough. This "sampling" of the voltage supply to coil 19 by the momentary closure of starting switch 23 continues until the voltage supplied thereto becomes sufficient or the faulty condition is corrected.

With manually operable switch 35 in the "manual on" position the circuit of Figure 1 permits manual programing rather then "automatic" programing through switch 30. Depending upon the position of bypass switch 38, the circuit may be manually operated either with or without the random start and undervoltage protection features provided by momentarily closing starting switch 23. If it should be desired continually to operate motor 10 or manually temporarily to operate or jog one of the motors 10 when program switch 30 is open, bypass switch 38 is placed in its "A" position and manually operable switch 35 is depressed to its "manual on" position, as desired. Moreover, if it should be desired to control the period of operation of motor 10 mnaually but to retain the random start and overload protection features, provided by the operation of momentary contacting switch 23, then bypass switch 38 is thrown to its "B" position and manually operable switch 35 operated between its "off" and "on" position as desired. In addition, timer 22 may be constructed such that either program switch 30 or starting switch 23 may be momentarily manually depressed if desired.

A preferred mechanical construction for timer 22 is illustrated in Figures 2–6.

A time indicating wheel 31a is driven by timing motor 24a through gear train 32a at a speed of one revolution per twenty-four hours; the prevailing time being indicated by a stationary marker 45. A plurality of closely-spaced program adjusting members 40a are supported in a circle near the circumference of the wheel and extend through the wheel with actuating tabs 46, 47 best seen in Figures 3 and 4 extending radially outward on opposite sides of the wheel, as shown. These program adjusting members 40a are movable between two radial positions in one position of which tab 46 is beneath a first actuating lever 48 of the switch mechanism and in the other position of which tab 47 is beneath a second actuating lever 49 of the switch mechanism. The ends of levers 48, 49 are elevated by these tabs during the movement of wheel 31a whenever the programing members 40a are in a proper position to bring one or the other of the tabs directly beneath the levers. Actuating levers 48 and 49 operate through suitable mechanical linkage comprising a pair of parallel horizontally slidable insulating plates 50, the front one shown in Figure 6, to move a contact assembly 30a between open- and closed-contact positions depending upon which of the two contact levers 48 or 49 is elevated during any given interval of time. The construction and operation of this program switch actuating portion of timer mechanism 22 is well known to those skilled in the art and will therefore not be further described here.

Figure 5:
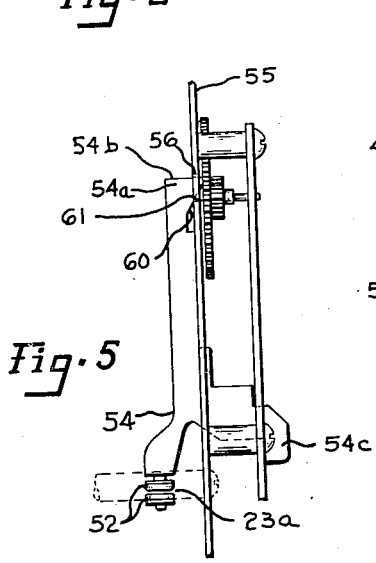
Figure 5 is a side view of the momentary closing switch of the timer of Figure 2.
Figure 6:
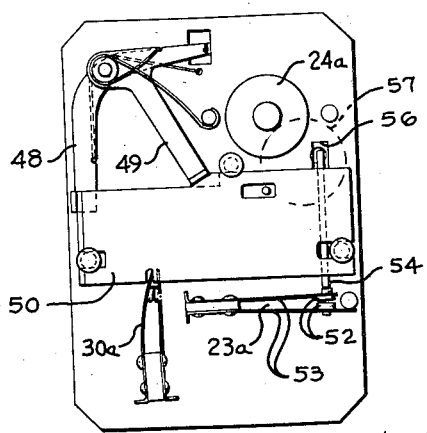
Figure 6 is a rear view of the timer of Figure 2 with the magnetic core and coil of the timing motor removed.

Timer 22 also contains a momentary contacting switch assembly 23a best seen in Figures 5 and 6, comprising contacts 52 mounted on resilient conductive arms 53 and moved between open and closed positions by an insulating push rod 54. Push rod 54 is mounted in a vertically reciprocable manner on the timer supporting plate 55 and has an integrally formed manually depressible arm 54c extending out through the front face of the timer 22 for manually closing switch 23a whenever desired. Push rod 54 is normally urged or biased upward and forward by the resilience of the upper contact-carrying switch arm 53.

The upper end 54a of push rod 54 extends through a hole 56 in a supporting plate 55 and rides against the rear surface of a plastic gear 57. Gear 57 is driven by motor 24a through a gear 25a to rotate once every four minutes. Gear 57 has a small hole 58 within which the end 54a of push rod 54 falls whenever the hole is aligned with this end of the push rod. Continued rotation of gear 57 causes the upper end surface 54b of push rod 54 to engage the rim 59 of hole 58 and thereafter to depress the push rod until the contacts 52 engage. Further downward movement of push rod 54 under the influence of the rotation of gear 58 causes an inclined surface 60 of rod 54 adjacent its upper end 54a to bear against the lower rim 61 of the hole 56 in the timer supporting plate 55 thereby lifting the upper end surface 54b of push rod 54 out of the gear hole 59, whereupon push rod 54 snaps back to its elevated position under the influence of resilient switch arms 53, thereby re-opening contacts 52 of switch assembly 23a. Contacts 52 are thus closed once every four minutes for about 5 seconds.

Although I have described above specific embodiments of the invention, many modifications may be made. For example, permanent connections may be substituted for bypass switch 38 and manually actuated switch 35 if desired for certain applications. In addition, range timers 22 having a mechanical construction different from that disclosed in Figure 2 may be employed to accomplish the purpose of actuating starting switch 23 and program switch 30. It is to be understood that I intend by the appended claims to cover all such modifications as fall within the true spirit and scope of the invention.

What I claim as new and desire to secure by Letters Patent of the United States is:

1. A protective starting circuit for an electric motor comprising, a magnetic contactor having principal contacts connected in circuit with the motor, auxiliary contacts and an energizing coil for closing said contacts, a switch connected in parallel with said auxiliary contacts and in series with said coil for connection across a voltage source, a continuously operating electric timer energized separately from said contactor and means operative in response to movement of said timer for periodically closing said switch for very brief time intervals insufficient to damage said contactor or motor upon undervoltage of said source.

2. A protective motor control circuit comprising, a magnetic starting contactor for said motor having an actuating coil and auxiliary contacts closed upon energization of said coil, a manually operable switch, an electric timer energized independently of said magnetic contactor and having a program switch, a starting switch and means for momentarily closing said starting switch every few minutes, said starting switch being connected in parallel with said auxiliary contacts and in series with said program switch, said manually operable switch being operable in one position to connect only said actuating coil of said contactor across a voltage source.

3. A motor control circuit comprising a magnetic starting contactor for said motor having an actuating coil and auxiliary contacts closed upon energization of said coil, an electric timer having a program switch, a starting switch and means for momentarily closing said starting switch every few minutes, said starting switch being connected in parallel with said auxiliary contacts and in series circuit with said program switch and said actuating coil of said contactor, and circuit means including a manually operable switch having one position for connecting said series circuit across a voltage source and having a second position for connecting only said coil of said series circuit across a voltage source.

4. A motor control circuit comprising a magnetic starting contactor for said motor having auxiliary contacts and an actuating coil for closing said contactor and said auxiliary contacts, an electric timer having a program switch and a starting switch, means operative in response to the movement of said timer for periodically closing said program switch and for momentarily closing said starting switch every few minutes, said starting switch being connected in parallel with said auxiliary contacts and in series circuit with said program switch and said actuating coil of said contactor, and circuit means including a manually operable switch having one position for connecting said series circuit across a voltage source and having a second position for connecting only said starting switch and said coil of said series circuit across a voltage source.

5. A protective motor control circuit comprising a magnetic starting contactor for said motor having auxiliary contacts and an actuating coil for closing said contactor and said contacts, an electric timer energized independently of said magnetic contactor and having a program switch, a starting switch and means for momentarily closing said starting switch every few minutes, said starting switch being connected in parallel with said auxiliary contacts and in series with said program switch and said actuating coil of said contactor for connection across a voltage source.

6. A protective control system for actuating a plurality of electrical devices from a common source of power comprising a plurality of control circuits each including an electromagnetic contactor having principal contacts connected in circuit with one of said devices to deliver power thereto from said source and having auxiliary contacts, said contacts being arranged for closure upon energization of the contactor, a switch connected in parallel with said auxiliary contacts and in series with said contactor for connection to a voltage source derived from said source of power, a timer energized independently of said contactor, and means operative in response to movement of said timer for periodically closing said switch for very brief time intervals insufficient to damage said contactor or device upon abnormal voltage conditions of said voltage source, the timers of said control circuits operating their associated switches in random time sequence.

7. A protecting control system for starting a plurality of electrical motors from a common source of electrical power comprising, a plurality of control circuits each including a magnetic starting contactor for one of the motors said contactor having an actuating coil and auxiliary contacts closed upon energization of said coil, an electric timer energized independently of said contactor and having a program switch for closure at preadjusted times and having a starting switch for momentary closure every few minutes, said starting switch being connected in parallel with said auxiliary contacts and in series with said program switch and said coil for connection to a voltage source derived from said source of power, the timers of the various control circuits being arranged to close said starting switches in random sequence.

8. A protective control system for actuating a plurality of electric devices from a common source of electrical power comprising a plurality of control circuits each including an electromagnetic relay having principal contacts in circuit with one of said devices to deliver power thereto from said source and having auxiliary contacts, said contacts being arranged for closure upon energization of the relay, a program switch, a starting switch connected in parallel with said auxiliary contacts and in series with said program switch and said relay for connection to a voltage source derived from said source of power, a timer energized independently of said contactor, and means operative in response to the movement of said timer for periodically closing said program switch and for periodically closing said starting switch for very brief time intervals insufficient to damage said relay or said device upon abnormal voltage conditions of said voltage source, the timers of said control circuits operating their associated starting switches in random time sequence.

9. A time-controlled undervoltage protecting circuit for a magnetic contactor having an operating coil and auxiliary contacts arranged for closure upon energization of the contactor, said circuit comprising a separately energized continuously operating electric timer and a switch continuously operated by said timer in a cyclic manner, said switch being connected in parallel with the auxiliary contacts of the magnetic contactor and in series with the operating coil of the magnetic contactor for connection across a voltage source, said switch operating cycle comprising a momentary period of closure followed by an open period of relatively long duration in respect to said period of closure, said momentary period of closure being insufficient to damage the contactor upon occurrence of an undervoltage condition of the source.

References Cited in the file of this patent

UNITED STATES PATENTS

| | | |
|---|---|---|
| 2,348,953 | Briggs | May 16, 1944 |
| 2,444,295 | Kaiser | June 29, 1948 |